Feb. 19, 1963 R. A. GILLESPIE 3,077,962
CURTAIN WALL METAL WINDOW FRAME
Filed Dec. 2, 1960 3 Sheets-Sheet 2
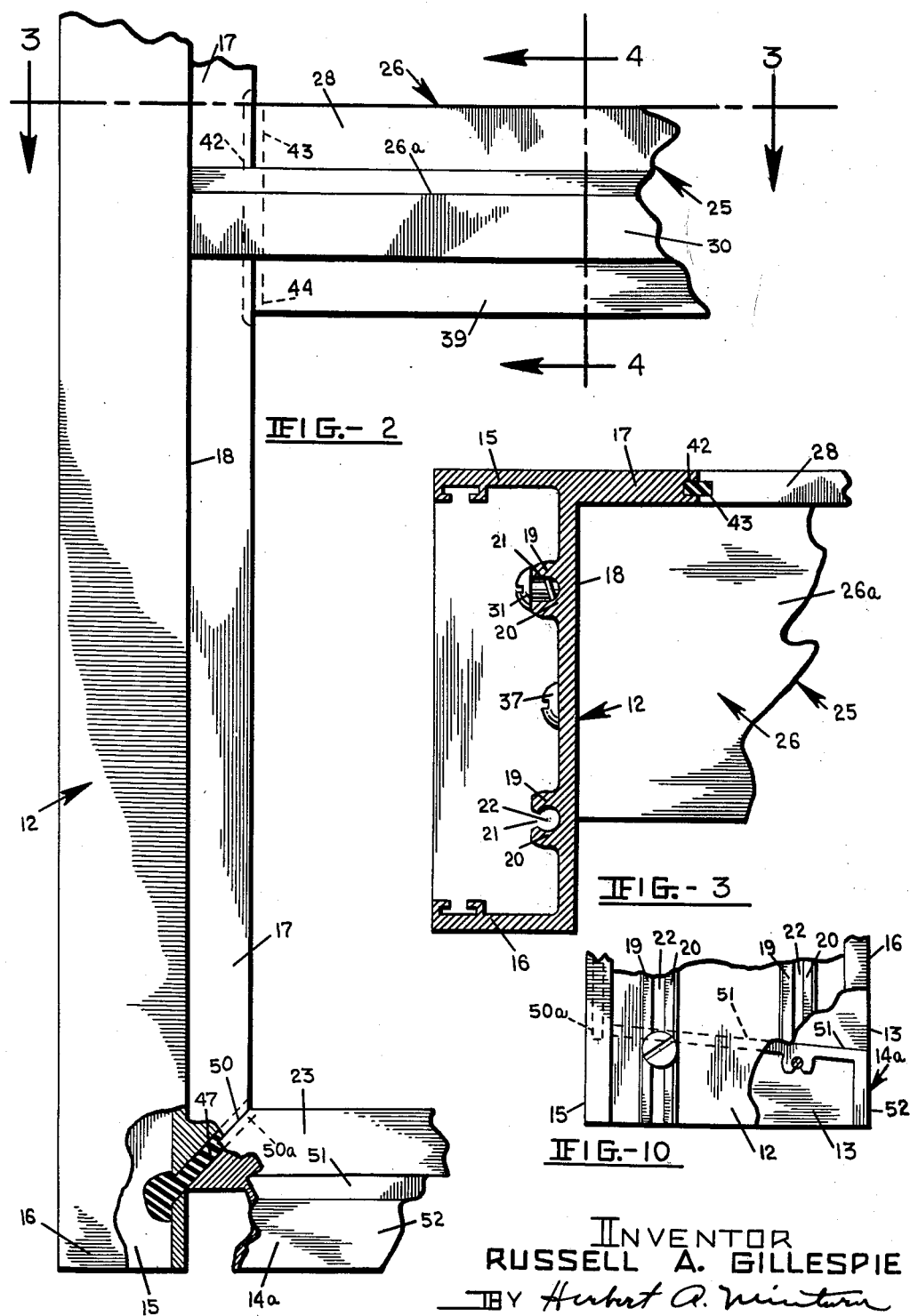
INVENTOR
RUSSELL A. GILLESPIE
BY Herbert A. Minturn
ATTORNEY Feb. 19, 1963　　R. A. GILLESPIE　　3,077,962
CURTAIN WALL METAL WINDOW FRAME
Filed Dec. 2, 1960　　3 Sheets-Sheet 3
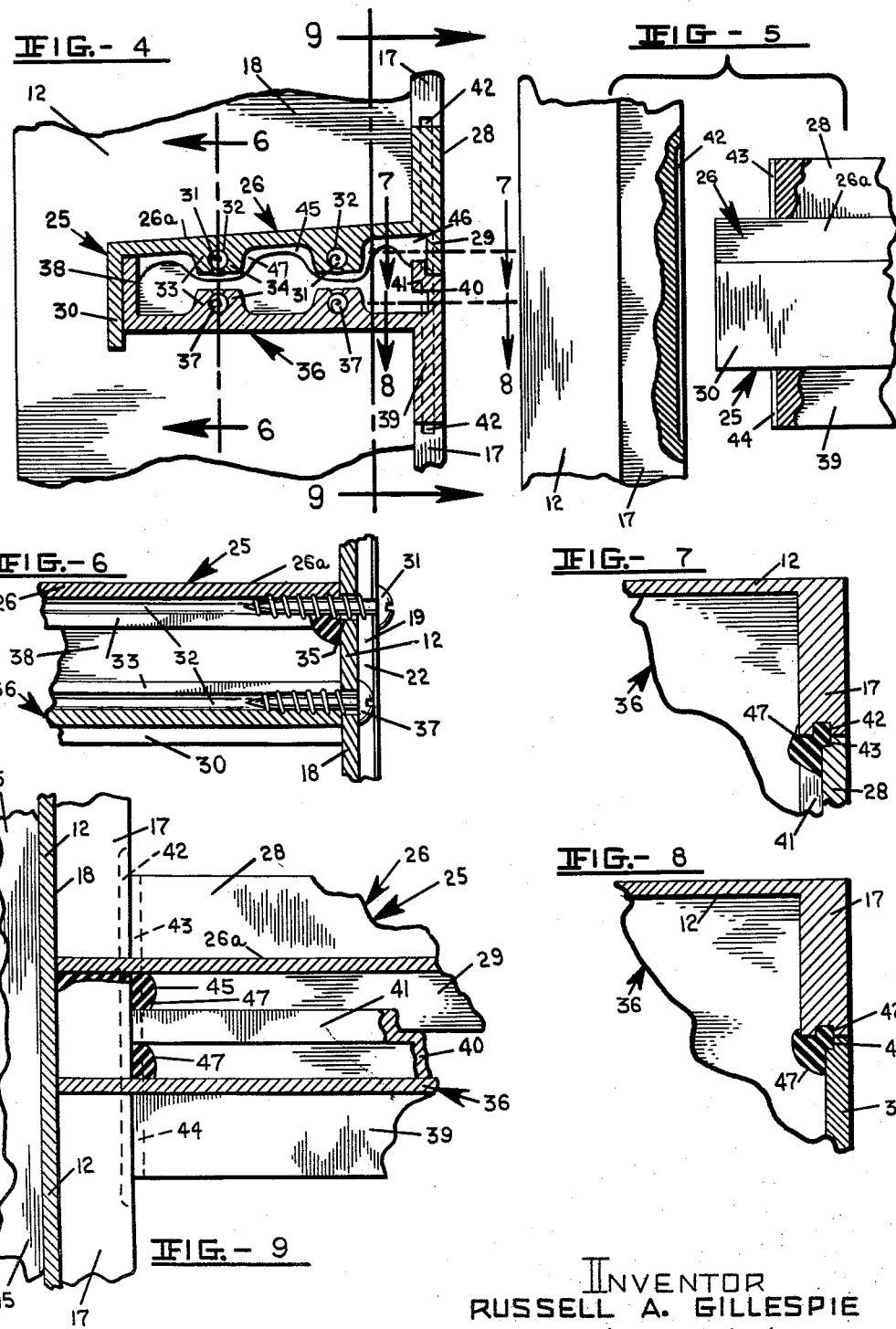
INVENTOR
RUSSELL A. GILLESPIE
BY Herbert A. Minturn
ATTORNEY United States Patent Office 3,077,962
Patented Feb. 19, 1963

3,077,962
CURTAIN WALL METAL WINDOW FRAME
Russell A. Gillespie, Indianapolis, Ind., assignor to Engineering Metal Products Corporation, Indianapolis, Ind., a corporation of Indiana
Filed Dec. 2, 1960, Ser. No. 73,310
4 Claims. (Cl. 189—75)

This invention relates to a metallic frame made of an aluminum alloy, stainless steel, or other suitable metals, in which frame there may be fixed or detachably held closure elements such as glass, metal, or fabricated panels. The glass will normally be detachable from the frame by means of a bounding elastic molding interfitting the glass and the frame element, and likewise the other type of panels may be secured to the frame.

The means for securing the glass or panels to the frame does not constitute the invention per se in the present invention, and therefore will not be described nor illustrated.

It is the primary object of the present invention to provide a frame which may be widely acceptable and used by the trade for enclosing buildings by reason of the specific mechanical design of the frame providing a rigid frame which will be non-leaking, and which may be made in the absence of welding interconnecting members of the frame.

The frame embodying the present invention may be fabricated at a central plant and delivered to the job ready for mounting and attaching to the skeletal frame of the building. Joints between the frame members including mullions are rendered watertight by means of applying a synthetic elastomer which is made up at the fabricating plant by intermixing two separate sets of ingredients which interact at ambient temperatures into what is now believed to be a permanent rubber-like material and which is not only characterized by the usual qualities embodied in the definition of an elastomer, but also has a strong bonding ability between itself and metallic surfaces so that the material does not separate but remains intimately bonded to the abutting or interconnecting metal parts of the frame.

The elastomer employed is one of the newer elastomers coming within the usual definition of an elastomer such as any material, particularly of the class of synthetic polymers, which can be stretched to repeatedly 150% or more of its normal length, and which returns rapidly and forcefully to its original shape. One such base material is commercially obtainable at present under the trademark of the manufacturer of the material, Thiokol.

This elastomer sealant is a polysulfide liquid polymer material supplied to the fabricator as a two component unit consisting of a base (Thiokol) and an activator to be mixed to form a flexible, firm rubber as the sealant.

These and many other objects and advantages of the invention will become apparent in the following description of one particular form of the invention as illustrated in the accompanying drawings, in which:

FIG. 2 is a frontal elevation in detail of a portion of the frame, and in partial section;

FIG. 3 is a transverse horizontal section on a line 3—3 in FIG. 2;

FIG. 4 is a vertical section on the line 4—4 in FIG. 2 on an enlarged scale;

FIG. 5 is a view in front elevation of two interconnecting members shown in disassociated relation;

FIG. 6 is a view in vertical elevation on the line 6—6 in FIG. 4;

FIG. 7 is a detail in horizontal section on the line 7—7 in FIG. 4;

FIG. 8 is a horizontal section on the line 8—8 in FIG. 4;

FIG. 9 is a vertical section on the line 9—9 in FIG. 4; and

FIG. 10 is a view in side elevation and partial section of a detail of a lower corner of the frame.

Figure 1:
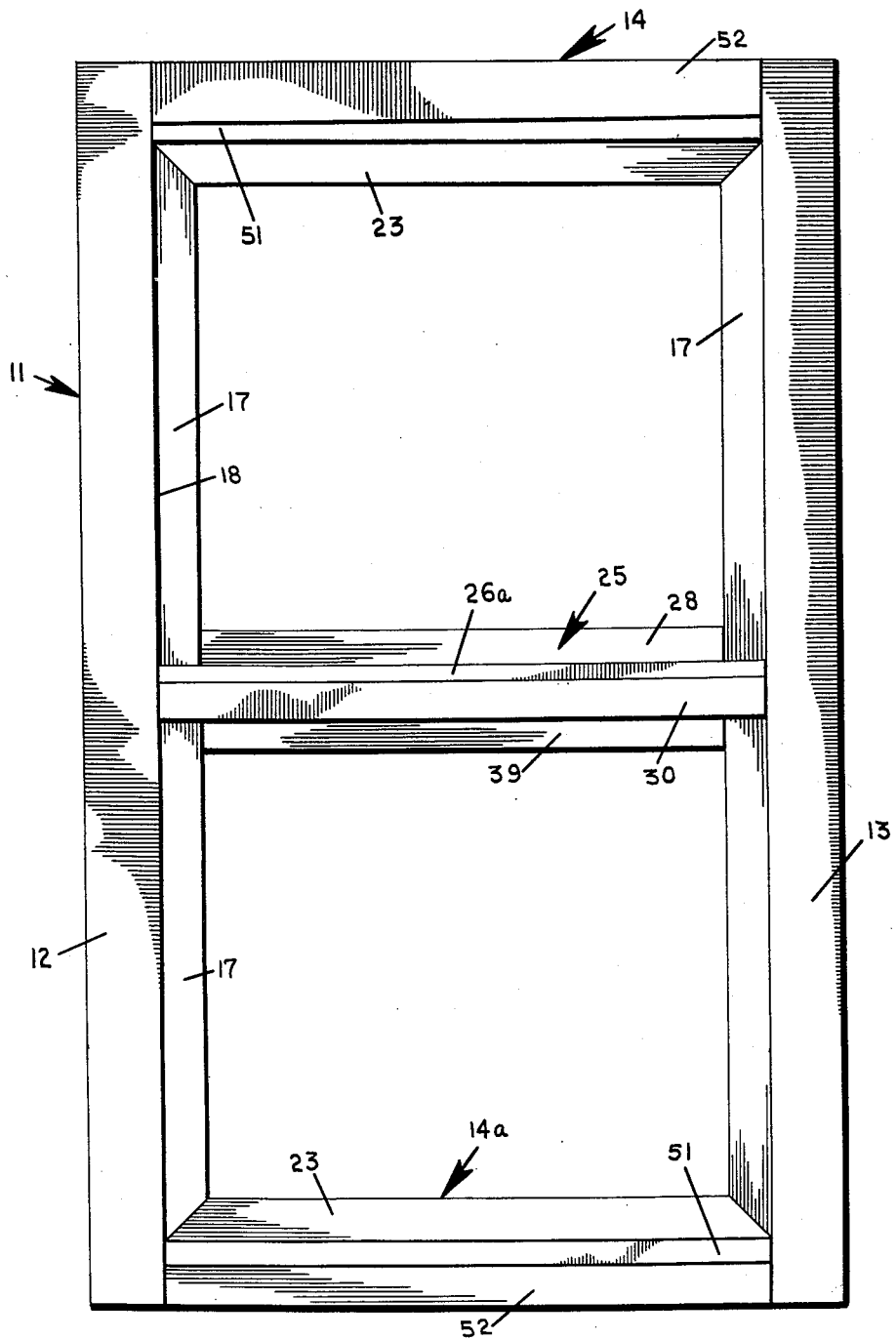
FIG. 1 is a view in frontal elevation of a frame embodying the invention.

A frame generally designated by the numeral 11 has a pair of side stiles 12 and 13 identical in cross-section, and top and bottom rails 14 and 14a respectively. The top rail 14 may be identical in cross-section to that of the stiles. A section through the stile 12 is illustrated in FIG. 3. The stile 12 is, in the present showing, an aluminum extrusion. The stile is in effect a channel bar in shape having the front and back legs 15 and 16. A rib 17 extends oppositely from the face 18 of the stile at one side thereof oppositely from the leg 15, and in the present form is somewhat thicker than the leg 15.

On the back or inner side of the stile 12 there are provided spaced-apart pairs of ribs, between which ribs there is a generally cylindrical opening 21 in turn opening outwardly through a slot 22 of a length continuous with the length of the ribs 19 and 20. The top and bottom rails 14 and 14a interconnect with the stiles 12 and 13 at their top and bottom ends respectively.

The top rail 14 has the same cross-sectional shape as do the stiles 12 and 13, the rail 14 having the depending rib 23.

In the present showing of the invention, the frame 11 is divided centrally, vertically, by a cross-bar or mullion generally designated by the numeral 25, extending horizontally between the stiles 12 and 13 intermediate the top and bottom rails 14 and 14a. This rail 25 is a composite rail, being formed from an upper section 26 and a lower section 36. The section 26 has a top sill 26a which extends between the stiles 12 and 13, with its ends in abutment therewith. From the rear side of the apron 26a, there extends upwardly therefrom a rib 28 having its upper section the same as is that of the rib 17. Below the apron 26a, there is a downwardly extending rib 29 of substantially half the width of the rib 28, and less in height from that of the rib 28, FIG. 4. The front of the sill 26 has a depending apron 30. The end of the rib 28 in each instance abuts the edge of the rib 17 of the stiles. This upper section 26 of the rail 25 is fixed in position by screws 31 passing through the stiles 12 and 13 and into the cylindrical opening 32 provided between each of the downwardly depending ribs, these two pairs being spaced apart one from the other as best indicated in FIG. 4.

The screw 31 which is adjacent to the stile leg 15 is entered through the opening 22 between the ribs 19 and 20, through a hole 35 in the member 18 and self-threadedly engaged between the ribs 33 and 34, entering into the cylindrical opening 32. The threads of the screw 31 are of course of greater diameter in their major diameters than is the diameter of the hole or opening 32. The other screw 37, FIG. 6, may be entered directly through the member 18 and into the opening 32 of the other pair of ribs 33 and 34, these being the ribs adjacent the apron 30.

The cross rail 25 is completed by an undersection 36 which likewise extends into abutment by its ends respectivley with the rib 17 on the two stiles 12 and 13. This undersection 36 is secured by screws passed through the member 18 of the stiles in vertical alignment below the upper screws 31 and in the same manner.

The lower section 36 has an upturned flange 38 which fits within and against the depending apron 30, FIG. 4, at its outer end, and has a downturned rib 39 of the same width as is that of rib 17, and of the same length as is the extension of the rib 17 from the stiles 12 and 13. The section 36 also has an upturned rib 40 leaving the top side of the section 36 by a width substantially half that of the width of the rib 39, and then has an L-shaped upper end 41 which abuts the underside of the member 29 and then extends upwardly along the inner side thereof a short distance. There is space left between the top end of the extension 41 and the underside of the section 26 forwardly of the member 29, and likewise there is a rectangular cavity along the flange 40 below the member 41.

Before assembly with the stiles 12 and 13, the stile has, in each instance, a rectangular groove 42 milled along the rib 17 in each instance, the length of the groove 42 being slightly greater than the overall height of the two ribs 28 and 39 when the sections 26 and 36 are in assembled position as has been described above. Likewise the upper rib 28 is milled to have the end groove 43 opening thereabove and continued down across the end of the rib 29, which provides a cutaway portion at the bottom of the opening left between the underside of the section 26 and the top side of the member 41, FIG. 4. Likewise the under rib 39 is milled away to the same width as that of groove 42 to provide the groove 44 across the end of the rib 39 to the top of the member 41 thereby leaving an opening from the groove into the groove 43 across the opening between the top side of the member 36 and the underside of the member 41, FIG. 4. Then when the crossbar 25 is fixed to the two stiles 12 and 13, as indicated in FIGS. 2, 3, and 4, there is a continuous passageway 42, 43, 44 between the ribs 28 and 39 with the two openings, one above and one below the member 41.

After the composite rail 25 has been assembled between and with the stiles 12 and 13, the elastomer as above indicated is prepared in a flowable state and forced down into the combined passageway formed by the groove 42, 43, and 44. Some of ths material generally designated by the numeral 45 will flow from the upper portion of this combined groove, out through the opening above described and designated by the numeral 45 under sill 26a. There it will unite and adhere to a coating 47 of the same material which has been applied along the under junctions of section 26 with the stiles 12 and 13, FIG. 4. Also the liquid material 45 will flow on down the groove 42 in conjunction with the groove 44, some flowing out through the opening under the member 41, but the remainder of the material coming on out the bottom of the groove 42 under the rib 39 to indicate that the material has passed entirely therethrough. This material sets up generally within a period of not to exceed twenty minutes and becomes a permanent bond between the metal surfaces which are contacted by the material, and thereby prevents entrance of water or air through the abutting sections. The material 47 is applied prior to the mounting of the under section 36, and by reason of the long flange 38, there is no tendency for water to enter upwardly between it and the apron 30. The downwardly extending rib 39 is of course sealed in its abutment with the rib 17, so that there is no leakage therebetween. Incidentally, the upper end of the flange 38 comes into contact with the material designated by the numeral 47 so that even though any moisture might tend to creep up between the flange 38 and the apron 30, it is stopped at the upper end of the flange 38.

The ends of the top and bottom rails 14 and 14a are united with the upper and lower ends respectively of the stiles 12 and 13 in a similar manner, and therefore one description of this juncture is sufficient and will apply to each of the four joints. In this regard, reference is made to FIG. 2 to the lower portion thereof.

The lower end of the rib 17 is cut on a bevel at a 45 degree angle and above the lower end of the stile. Likewise the ends of the rib 23 are mitered to come into abutment with the diagonal end of the rib 17. Thus, the end of the rib 17 and the end of the rib 23 come together on the line 50. The diagonal abutting ends of the assembled ribs 17 and 23 are drilled thereacross, the drilling being centered laterally of the plane of the abutment, so that substantially half of the drilled hole 50a is in each rib end. It is through this hole that the sealant 47 is flowed until an anchoring quantity protrudes from the lower end of the hole. The rails 14 and 14a have the same cross-sectional shape, and each has a sloping area 51 extending from the rib 23 to the outer faces of the stiles 12 and 13. There is a downturned apron 52 extending from the forward edge of the area 51 and having its outer face in the same plane as the outer faces of the stiles 12 and 13.

The extension of the rails 14 and 14a from their back ribs 23 differs in respect to the extension of the area 26a of the member 25 in that the downturned apron 30, FIG. 4, is spaced inwardly from the outer faces of the stiles 12 and 13.

The rail 14 and 14a may be complete as they have been described, or they may have an auxiliary section added thereto such as a section similar to section 36. However, this particular feature does not enter into the invention per se and therefore is not indicated.

Therefore it is to be seen that I have provided a construction which may be readily assembled from individual parts, easily prepared for the assembly, and wherein the various parts are united with primary means such as screws, and effective sealing means is had through the use of the plastic sealing medium sealing off all joints where there is possibility of water penetrating, and doing so in a permanently bonded manner as between the metal and the plastic, all in the absence of welding. While the invention has been disclosed in minute detail in the particular form as illustrated and described, it is obvious that structural changes may be made in the various part without departing from the spirit of the invention, and I therefore do not desire to be limited to that precise form beyond the limitations which may be imposed by the following claims.

I claim:

1. A wall panel receiving frame comprising a pair of spaced apart side rails;
   a rib on each side rail extending therealong each having a free edge directed one toward the other, the ribs being in a common plane;
   a top and a bottom rail interposed respectively between upper and lower portions of said side rails;
   a rib on each of said top and bottom rails extending therealong each having a free edge directed one toward the other and being in said common plane;
   said top and bottom ribs being in abutment by end areas with areas of opposing edges of said ribs on the side rails;
   mechanical means rigidly interengaging said side rails with said top and bottom rails maintaining said abutments of all of said ribs;
   said abutting areas, each having side-by-side passageways thereacross forming combined unitary passageways across the abutments, said passageways being approximately centered within said plane, and open at each end;
   and an elastic water sealing and metal adhering material entered from one end of and filling under pressure each of said passageways flowed therethrough to the opposite ends of the passageways, said material adhering to the walls of the passageways;
   all of said rails and ribs being metal.

2. The structure of claim 1 in which said abutments are mitered at a substantially forty-five angle, and said mechanical means maintains said miter in fixed condition.

3. The structure of claim 1 in which there is a mullion spacing apart said side rails intermediate said top and bottom rails;
   said mullion comprising an upper and a lower portion;
   a rib extending respectively upwardly and along said upper mullion portion and downwardly from and along said lower portion, both ribs abutting by their ends said side rail rib opposing edges;

mechanical means maintaining the mullion-rib to side rail-rib abutments;

the ends of said mullion ribs and the edge portions of said side rail ribs being slotted defining a common passageway between those abutting ends and edge portions, the passageway being open both above and below said upper and lower mullion ribs;

an elastic, metal adhering, sealing material received in said mullion-rib to side rail-rib passageways under pressure.

4. The structure of claim 3, in which said mullion upper and lower portions are separate members and there is a top sill apron on the upper portion abutting said side rails forwardly of said side rail ribs;

mechanical means rigidly interengaging said sill with said side rails;

the lower mullion portion extends under the upper portion to abut by its ends said side rails;

mechanical means rigidly interengaging said lower mullion portion ends with said side rails;

a flange along an outside edge of said mullion lower portion turned upwardly within and against said apron;

the mullion lower rib extending downwardly from the rear side of said lower mullion portion;

legs extending along said rail ribs from said upper and lower mullion portions into abutment;

said mullion end passageways opening between said upper and lower portions, said sealing material having a flow portion into the space between the mullion upper and lower portions and around the exposed areas of the side rails and their ribs within said space.

References Cited in the file of this patent
UNITED STATES PATENTS

| | | |
|---|---|---|
| 668,720 | Siegmund | Feb. 26, 1901 |
| 2,351,127 | Hodson | June 13, 1944 |
| 2,679,305 | Gunthorp | May 25, 1954 |
| 2,736,403 | Gwynne | Feb. 28, 1956 |